United States Patent Office 2,889,213
Patented June 2, 1959

2,889,213
ENGINE FUEL CONTAINING ANTI-ICING ADDITIVES

Olaf E. Larsen, Bartlesville, Okla., assignor to Phillips Petroleum Company, a corporation of Delaware No Drawing. Application January 6, 1954
Serial No. 402,594

19 Claims. (Cl. 44—76)

This invention relates to a novel fuel composition. In one aspect it relates to a method of operating an internal combustiion engine. In another aspect, it relates to a method of preventing cold stalling of such an engine.

It has been observed that an internal combustion engine having a carburetor will stall while being warmed up when certain combinations of atmospheric temperature and humidity exist. This stalling, known as "cold stalling," is caused by the formation of ice on the throttle plate and adjacent parts of the carburetor, and especially around the idling jet and throttle plate. The ice results from the cooling effect of the vaporization of fuel within the carburetor and from the pseudo-adiabatic expansion of carburetor air in the metering venturi and past the edges of the throttle plate, the cooling causing moisture in the incoming air to accumulate as ice in the carburetor. The accumulated ice prevents free flow of fuel and air to the cylinders. Cold stalling ordinarily occurs when the atmospheric temperature is in the range of about 30 to 60° F. and the relative humidity is greater than about 60 percent.

One prior art method of preventing cold stalling caused by ice formation in the carburetor involves the incorporation of isopropyl alcohol as an anti-icing agent into the fuel supplied to the engine. In road tests using four 1953 model automobiles operated in an ambient air temperature of 40° F. and supplied with air of 100 percent relative humidity, an average of 16 stalls for each car was encountered using a regular grade fuel not containing an anti-cold-stalling additive. The addition of 2 weight percent isopropyl alcohol to the fuel resulted in freedom from cold stalling in all of the automobiles under the conditions of the test, but the addition of only 1 weight percent isopropyl alcohol resulted in an average of 3 stalls in each of the four automobiles. More recent tests show that 2 weight percent of isopropyl alcohol, though effective, does not give complete freedom from stalling in all cars. The procedure used in the road test comprised starting and idling the engine, which was originally at the temperature of the ambient air, for a period of 20 seconds; driving the automobile at 20 miles per hour for 0.2 mile; stopping the automobile and idling the engine for 20 seconds; and repeating the driving, stopping, and idling procedure until three consecutive stall-free stops were obtained. Whenever the engine stalled, it was immediately restarted and driven for 0.2 mile at 20 miles per hour before another stop was made.

The present invention provides a method and a novel fuel composition, whereby the operational difficulties of cold-stalling and rough idling, encountered in connection with carburetted internal combustion engines, such as automotive, aircraft, marine engines, and the like, operated under cool, humid atmospheric conditions, are reduced. The invention provides a fuel composition which permits a carburetted internal combustion engine to be operated at idling or light load conditions in atmospheric condtions of temperature in the range of 30 to 60° F. and relative humidity above about 60 percent without excessive stalling resulting from the formation of ice in the carburetor of the engine.

According to this invention, there is provided an improved fuel comprising a hydrocarbon fuel which boils in the gasoline range and a minor proportion of an additive which is a product of the chemical condensation of a tertiary alkyl mercaptan with ethylene oxide.

Also according to this invention there is provided a method of preventing cold stalling during the operation of an internal combustion engine which is subject to cold stalling which method comprises supplying, with a hydrocarbon fuel, to the carburetor of such an engine, a chemical condensation product as above described.

The additive can be supplied as a contituent of the fuel, e.g., in solution or emulsion in the hydrocarbon, or it can be supplied from a separate source along with the hydrocarbon fuel. Ordinarily the additive is supplied in solution in the hydrocarbon fuel.

According to this invention, carburetor icing is substantially prevented by admixing with the fuel a small amount of a polymeric material formed by chemical condensation of a tertiary alkyl mercaptan and ethylene oxide in a proportion of from 3 to 14 mols of ethylene oxide per mol of mercaptan. Preferably, the tertiary alkyl mercaptan contains at least 8 and not more than 20 carbon atoms. Tertiary alkyl mercaptans which may be condensed with ethylene oxide to form an additive which has anti-icing properties when admixed with a hydrocarbon fuel include t-octyl mercaptan, t-dodecyl mercaptan, t-tetradecyl mercaptan, t-hexadecyl mercaptan, and the like. This polymeric material is very effective when admixed separately with the hydrocarbon fuel in small amounts; however, this material can also be employed in combination with compounds having an anti-icing effect to obtain an improved anti-icing additive. Specific compounds which can be admixed with the additives of this invention are the monoalkyl ethers of the monoethylene, diethylene, and triethylene glycols and include ethylene glycol monoethyl ether (Cellosolve) and diethylene glycol monoethyl ether (Carbitol). Compounds which have no anti-icing effect by themselves can also be admixed with the simple or combination additives to increase the amount of these compounds which can be dissolved in the fuel. Methyl and ethyl alcohol are commonly used for this purpose.

The amount of the additives admixed with the engine fuel varies over a wide range and depends to some extent on the physical properties of the compounds. Usually, the concentration of the additive admixed with the fuel is not greater than 10 weight percent and the actual concentration depends on the solubility of the additive in the fuel. Very small concentrations have been found to have very effective anti-icing properties but usually the concentration is greater than 0.001 weight percent of the fuel. Preferably, the amount of additive used is in the range of 0.005 to 3.0 weight percent of the fuel and more preferably the concentration is in the range of 0.005 to 1.0 weight percent.

The anti-icing additives of this invention can be admixed with any carburetted internal combustion engine fuel and are of particular application to an engine fuel having a volatility such that the 50 percent distillation point falls below about 310° F. These fuels may be obtained from mineral oils or gaseous hydrocarbons derived from any source and by any of the known commercial methods of manufacture, such as straight-run distillation, catalytic cracking, thermal cracking, destructive hydrogenation, polymerization, alkylation, hydrogenation, or the like. The fuels can also contain commonly used fuel additives such as lead alkyl anti-detonants (e.g. tetraethyl lead), lead scavenging agents, dyes, gum inhibitors, oxidation inhibitors, and the like. The gasoline used should be free of elemental sulfur. It should be "doctor-sweet". Generally the fuel can be any desired hydrocarbon, or mixture of hydrocarbons, having a boiling point within the gasoline boiling range, i.e. 70 to 420° F., or it can be a liquefied petroleum gas, e.g. butane.

The methods of preparation of the additives of this invention are well-known in the art. Generally the preparation comprises reacting a tertiary alkyl mercaptan with ethylene oxide at a temperature of from about 60 to about 150° C. in the presence of a basic catalyst, such as an alkali-metal hydroxide, alkoxide, or mercaptide. The product can be purified by treatment with clay followed by filtration.

EXAMPLE 1

Cold stalling tests were performed using a Carter carburetor, type WO–870S, mounted on a motored CFR supercharged aviation fuel test engine which served to draw the fuel through the carburetor and to dispose of the combustible fuel-air mixture. The carburetor was mounted in an insulated chamber and the air supplied to the carburetor had a temperature of 40° F. and 100 percent relative humidity. The air was supplied at a rate of 0.58 pound per minute and the air-fuel ratio of the combustible mixture varied between 8:1 and 10:1. The CFR engine was operated at constant speed of 2000 r.p.m. with 6 inches Hg vacuum manifold pressure. The base fuel used in the tests was an unleaded automotive gasoline having a Reid vapor pressure of 14.0 lbs. and the following ASTM distillation (° F.):

| | |
|---|---|
| Initial | 79 |
| 10% | 96 |
| 20% | 109 |
| 40% | 138 |
| 60% | 186 |
| 80% | 264 |
| Final | 392 |

In the anti-icing tests, the fuels were cooled to a temperature of 40° F. and maintained at that temperature while being supplied to the carburetor.

In the test procedure, the CFR engine was operated on the injected fuel at a constant speed of 2000 r.p.m. and then the injected fuel flow rate was reduced as the test fuel was admitted to the engine through the carburetor to maintain the constant 2000 r.p.m. engine speed. The length of time was measured from the start of the flow to test fuel to the carburetor to the point where the ice buildup on the throttle plate and adjacent parts of the carburetor was sufficient to raise the manifold vacuum 2 inches of mercury. For purposes of evaluating the anti-icing qualities of the additives of this invention, these icing tests were also performed on a test fuel containing isopropyl alcohol.

The anti-icing characteristics of several of the additives of this invention are given in Table I and compared to the anti-icing effects of other additives. In obtaining these data, the base fuel was tested with several concentrations of additive and the concentration of additive equivalent in anti-icing quality to 1.5 or to 2.0 weight percent isopropyl alcohol was determined.

Table I

| Additive | Concentration in Weight Percent Equivalent to 1.5 Weight Percent Isopropyl Alcohol | Concentration in Weight Percent Equivalent to 2.0 Weight Percent Isopropyl Alcohol |
|---|---|---|
| 20 Wt. Percent t-Tetradecyl mercaptanethylene oxide condensation product. 80 Wt. Percent Ethylene glycol monoethyl ether. | 0.10 | 0.16 |
| Ethylene glycol monoethyl ether | 0.38 | 0.50 |
| Tetrahydro furfuryl alcohol | 0.16 | 0.23 |

The data show that the mixed additive according to this invention was quite effective as an anti-stall additive and that it was more effective than ethylene glycol monoethyl ether alone. It was also more effective than tetrahydrofurfuryl alcohol, an additive known in the prior art.

EXAMPLE 2

A road test was conducted to determine the effectiveness of different proportions of an additive according to this invention. The additive was a mixture consisting of 4 parts by weight of ethylene glycol monomethyl ether (methyl Cellosolve) and 1 part by weight of a product of the chemical condensation of ethylene oxide and tertiary tetradecyl mercaptan. The test was conducted with a 1953 model standard-make automobile.

Each test was conducted by starting the car, which had previously been allowed to cool to atmospheric temperature, allowing the motor to idle for 20 seconds, driving for 0.2 mile at 20 miles per hour, slowing to a stop, and idling the motor again for 20 seconds. Whenever the motor stalled, it was immediately restarted, and the procedure was repeated until the motor had been warmed sufficiently so that three consecutive normal idle periods, without stalling or rough idling, were obtained. The number of stalls occurring was noted, both for a fuel containing no anti-stall additive and for the same fuel containing an additive. The effectiveness of each additive was calculated as the percentage reduction in the number of stalls occurring.

The additive was used in solution in the base fuel, which had the properties shown in Table II.

Table II.—Properties of base fuel

| | |
|---|---|
| Gravity, °API | 71.0 |
| Reid vapor pressure, lbs. | 14.15 |
| ASTM distillation, percent distilled (method D86–46): | |
| I.B.P. | 83 |
| 5 | 92 |
| 10 | 99 |
| 20 | 110 |
| 30 | 123 |
| 40 | 140 |
| 50 | 160 |
| 60 | 187 |
| 70 | 220 |
| 80 | 262 |
| 90 | 319 |
| 95 | 352 |
| E.P. | 392 |
| Residue | 0.6 |
| Loss | 2.4 |
| Research octane No. (no TEL) | 82.4 |
| Composition, vol. percent: | |
| Light catalytically cracked gasoline | 55.9 |
| 12-lb. RVP natural gasoline | 31.7 |
| n-Butane | 12.4 |

The results of the road test are shown in Table III.

Table III

| Concentration of Additive in Base Fuel, Wt. Percent | Reduction in Stalling, Percent |
|---|---|
| 0.075 | 16 |
| 0.20 | 42 |
| 0.45 | 42 |

The data show that the mixed additive was effective in reducing stalling, at a concentration of 0.075 weight percent and that the effectiveness remained substantially constant between 0.20 and 0.45 percent concentration.

Similar results are obtained when the additive is a condensation product of ethylene oxide with t-octyl, with t-nonyl, with t-decyl, with t-dodecyl, or with t-hexadecyl mercaptan, either alone or in admixture with from 0.2 to 5 parts by weight, based on said condensation product, of an ethylene glycol or a monoalkyl ether thereof, as previously described.

While certain structures, examples, and process steps have been described for purposes of illustration, the invention is clearly not limited thereto. The essence of the invention is a composition comprising a major proportion of at least one gasoline hydrocarbon and a minor proportion of a product of chemical condensation of a tertiary alkyl mercaptan with ethylene oxide; and a method, for preventing cold stalling of an engine, comprising supplying such a condensation product to the carburetor of said engine, along with a hydrocarbon fuel which boils in the gasoline range. Variation and modification are possible within the scope of the invention and the disclosure and the claims thereto.

I claim:

1. A fuel composition comprising as a major component a gasoline and from 0.001 to 10 weight percent of a product of the chemical condensation of one molar proportion of a tertiary alkyl mercaptan having from 8 to 20 carbon atoms per molecule with from 3 to 14 molar proportions of ethylene oxide.

2. A composition according to claim 1 wherein the proportion of said product is from 0.005 to 3.0 weight percent.

3. A composition according to claim 1 wherein the proportion of said product is from 0.005 to 1.0 weight percent.

4. A composition according to claim 1 wherein said mercaptan is t-octyl mercaptan.

5. A composition according to claim 1 wherein said mercaptan is t-dodecyl mercaptan.

6. A composition according to claim 1 wherein said mercaptan is t-tetradecyl mercaptan.

7. A composition according to claim 1 wherein said mercaptan is t-hexadecyl mercaptan.

8. A composition according to claim 1 wherein said mercaptan is t-nonyl mercaptan.

9. A fuel composition comprising a gasoline as a major component and containing, in solution, from 0.005 to 3.0 weight percent of a product of the chemical condensation of from 3 to 14 molar proportions of ethylene oxide with one molar proportion of a tertiary alkyl mercaptan having from 8 to 20 carbon atoms per molecule and from 0.005 to 3 weight percent of a glycol ether selected from the group consisting of the monomethyl and monoethyl ethers of ethylene and polyethylene glycols.

10. A fuel composition comprising a gasoline as a major component and from 0.005 to 1.0 weight percent of an additive mixture comprising about 1 part by weight of a product of the chemical condensation of one molar proportion of t-tetradecyl mercaptan with from 3 to 14 molar proportions of ethylene oxide and about 4 parts by weight of the monoethyl ether of ethylene glycol.

11. A fuel composition, suitable as a fuel for an internal combustion engine having a carburetor, comprising as a major component hydrocarbons selected from the group consisting of hydrocarbon mixtures having a 50 percent distillation point below 310° F. and liquefied petroleum gas, and a minor proportion, sufficient to prevent cold stalling of such an engine, of a condensation product of one molar proportion of a tertiary alkyl mercaptan having from 8 to 20 carbon atoms per molecule with from 3 to 14 molar proportions of ethylene oxide.

12. As an additive for a fuel for use in an internal combustion engine having a carburetor, a mixture comprising from 0.2 to 5 parts by weight of a monoalkyl ether of an ethylene glycol and 1 part by weight of a product of the chemical condensation of one molar proportion of a tertiary alkyl mercaptan having from 8 to 20 carbon atoms per molecule with from 3 to 14 molar proportions of ethylene oxide.

13. As a gasoline additive, a mixture comprising from 0.2 to 5 parts by weight of ethylene glycol monoethyl ether and 1 part by weight of a product of the chemical condensation of one molar proportion of tertiary-tetradecyl mercaptan with from 3 to 14 molar proportions of ethylene oxide.

14. As a gasoline additive, a mixture comprising 20 weight percent of a product of the chemical condensation of one molar proportion of tertiary-tetradecyl mercaptan with from 3 to 14 molar proportions of ethylene oxide and 80 weight percent of ethylene glycol monoethyl ether.

15. As a gasoline additive, a mixture consisting of 4 parts by weight of ethylene glycol monomethyl ether and 1 part by weight of a product of the chemical condensation of from 3 to 14 molar proportions of ethylene oxide and one molar proportion of tertiary-tetradecyl mercaptan.

16. A method of operating an internal combustion engine having a carburetor which method comprises supplying to said carburetor, together with a hydrocarbon fuel boiling within the gasoline range, a small amount, sufficient to prevent stalling of said engine, of a chemical condensation product of one molar proportion of a t-alkyl mercaptan having from 8 to 20 carbon atoms with from 3 to 14 molar proportions of ethylene oxide.

17. A method of preventing the stalling of an internal combustion engine which method comprises supplying to the carburetor of said engine, together with a gasoline, when the atmospheric temperature is from 30 to 60° F. and the relative humidity is greater than 60 percent, from 0.005 to 1.0 weight percent, based on said fuel, of a product of the chemical condensation of one molar proportion of a t-alkyl mercaptan having from 8 to 20 carbon atoms per molecule with from 3 to 14 molar proportions of ethylene oxide.

18. A method according to claim 17 wherein said product is a product of the chemical condensation of t-tetradecyl mercaptan with ethylene oxide.

19. A method according to claim 18 wherein said product is supplied in admixture with 4 parts by weight of the monoethyl ether of ethylene glycol per part by weight of said product, the total amount of said product and said ether being about 0.04 weight percent of the total fuel supplied.

References Cited in the file of this patent

UNITED STATES PATENTS

| | | |
|---|---|---|
| 2,570,050 | Eby | Oct. 2, 1951 |
| 2,599,338 | Lifson et al. | June 3, 1952 |
| 2,600,113 | Jones et al. | June 10, 1952 |
| 2,642,400 | Harris | June 16, 1953 |
| 2,668,522 | Hickok | Feb. 9, 1954 |
| 2,807,526 | Foreman | Sept. 24, 1957 |

OTHER REFERENCES

"Aviation Gasoline Manufacture," by Van Winkle, McGraw-Hill, 1944, page 41.